US010416877B2

(12) United States Patent
Rucine et al.

(10) Patent No.: US 10,416,877 B2
(45) Date of Patent: Sep. 17, 2019

(54) SYSTEM AND METHOD OF GUIDING HANDWRITING INPUT

(71) Applicant: MyScript, Nantes (FR)

(72) Inventors: Nicolas Rucine, Nantes (FR); Erwan Jestin, Nantes (FR); Anthony Laurence, Nantes (FR)

(73) Assignee: MyScript, Nantes (FR)

( * ) Notice: Subject to any disclaimer, the term of this patent is extended or adjusted under 35 U.S.C. 154(b) by 0 days.

(21) Appl. No.: 14/886,200

(22) Filed: Oct. 19, 2015

(65) Prior Publication Data
US 2017/0060406 A1 Mar. 2, 2017

(30) Foreign Application Priority Data

Aug. 25, 2015 (EP) .................................... 15290218

(51) Int. Cl.
*G06F 17/00* (2019.01)
*G06F 3/0488* (2013.01)
*G06F 3/0484* (2013.01)
*G06F 3/023* (2006.01)
*G06K 9/22* (2006.01)
*G06K 9/00* (2006.01)

(52) U.S. Cl.
CPC ........ *G06F 3/04883* (2013.01); *G06F 3/0236* (2013.01); *G06F 3/0237* (2013.01); *G06F 3/0484* (2013.01); *G06K 9/00402* (2013.01); *G06K 9/00436* (2013.01); *G06K 9/222* (2013.01)

(58) Field of Classification Search
CPC .................................................. G06F 3/04883

USPC .................................................. 715/268, 255
See application file for complete search history.

(56) References Cited

U.S. PATENT DOCUMENTS 5,513,278 A * 4/1996 Hashizume ........ G06K 9/00422
345/467
6,664,991 B1 * 12/2003 Chew .................. G06F 3/04883
715/812

(Continued)

OTHER PUBLICATIONS

Steve Chase, "Use the Pens Tab in Word to Quickly Pen Your Signature", Published Jan. 9, 2015 (wayback), wordpress.com, pp. 1-4 (pdf).*

(Continued)

*Primary Examiner* — Manglesh M Patel
(74) *Attorney, Agent, or Firm* — McDermott Will & Emery LLP

(57) ABSTRACT

A systems, method and computer program product for use in guiding handwriting input to a computing device are provided. The computing device is connected to an input device in the form of an input surface. A user is able to provide input by applying pressure to or gesturing above the input surface using either his or her finger or an instrument such as a stylus or pen. The present system and method monitors the input strokes. The computing device further has a processor and at least one application for recognizing the handwriting input under control of the processor. The at least one system application is configured to cause display of, on an interactive display of the computer device, a guide element contiguous with at least a portion of display of digital ink corresponding to the handwriting input. The guide element is configured to guide further handwriting input.

12 Claims, 11 Drawing Sheets

(56) References Cited

U.S. PATENT DOCUMENTS

| | | | |
|---|---|---|---|
| 7,280,695 B2* | 10/2007 | Leung | G06F 3/04883 382/187 |
| 7,298,904 B2* | 11/2007 | Chen | G06K 9/222 382/186 |
| 7,873,217 B2* | 1/2011 | Koubaroulis | G06K 9/00409 382/179 |
| 2003/0038788 A1 | 2/2003 | Demartines et al. | |
| 2005/0175242 A1* | 8/2005 | Tanaka | G06K 9/222 382/187 |
| 2008/0260240 A1 | 10/2008 | Vukosavljevic et al. | |
| 2009/0002392 A1 | 1/2009 | Hou et al. | |
| 2009/0161958 A1 | 6/2009 | Markiewicz et al. | |
| 2015/0106684 A1* | 4/2015 | Gross | G06F 3/04883 715/222 |

OTHER PUBLICATIONS emacs, "Popup Ruler", published Jun. 26, 2015 (wayback), emacs, pp. 1-3 (pdf).*

Frederic Lardinois, Google Launches Handwriting Input for Text and Emoji on Android, Published Apr. 15, 2015, techcrunch.com, p. 1 (pdf).*

Bertel King: "Minuum Keyboard Lets You Type in Multiple Languages at Once Following Latest Update", Android Police, Dec. 18, 2014, XP055316496, Retrieved from the Internet: URL:http://www.androidpolice.com/2014/12/18/minuum-keyboard-lets-you-type-in-multiple-languages-at-once-update/ [Retrieved on Nov. 4, 2016], 6 pages.

Anonymous: "Can I Use SwiftKey With More Than One Language?", SwiftKey Support, Jun. 11, 2014 (Jun. 11, 2014), XP055316500, Retrieved from the Internet: URL:https://suppor.swiftkey.com/hc/en-us/articles/201764661-Can_I-use-SwiftKey-with-more-than-one-language- {Retrieved on Nov. 4, 2016}], 4 pages.

International Search Report and Written Opinion issued in related International Application No. PCT/EP2016/001445 dated Nov. 21, 2016, 13 pages.

International Search Report for Related Application No. PCT/EP2016/001445, dated Nov. 21, 2016, EPO—International, WPI Data.

"Minuum Keyboard Lets You Type in Multiple Languages at Once Following Latest Update", Dec. 18, 2014, URL: http://www.androidpolice.com/2014/12/18/minuum-keyboard-lets-you-type-in-multiple-languages-at-once-update/.

"Can I use SwiftKey with more than one language?", Jun. 11, 2014, URL: https://support.swiftkey.com/hc/en-us/articles/201764661-Can-I-use-SwiftKey-with-more-than-one-language-.

* cited by examiner

SYSTEM AND METHOD OF GUIDING HANDWRITING INPUT

CROSS-REFERENCE TO RELATED APPLICATIONS

This application claims priority to European Application No. 15290218.5 filed on Aug. 25, 2015, the entire contents of which is incorporated by reference herein.

TECHNICAL FIELD

The present description relates generally to the field of digital handwriting systems and methods using computing device interfaces. The present description relates more specifically to digital note taking systems and methods capable of recognizing user input handwriting of various characters, symbols and objects.

BACKGROUND

Computing devices continue to become more ubiquitous to daily life. They take the form of computer desktops, laptop computers, tablet computers, e-book readers, mobile phones, smartphones, wearable computers, global positioning system (GPS) units, enterprise digital assistants (EDAs), personal digital assistants (PDAs), game consoles, and the like. Further, computing devices are being incorporated into vehicles and equipment, such as cars, trucks, farm equipment, manufacturing equipment, building environment control (e.g., lighting, HVAC), and home and commercial appliances.

Computing devices generally consist of at least one processing element, such as a central processing unit (CPU), some form of memory, and input and output devices. The variety of computing devices and their subsequent uses necessitate a variety of interfaces and input devices. One such input device is a touch sensitive surface such as a touch screen or touch pad wherein user input is received through contact between the user's finger or an instrument such as a pen or stylus and the touch sensitive surface. Another input device is an input surface that senses gestures made by a user above the input surface. Either of these methods of input can be used generally for drawing or inputting text. When user input is text the user's handwriting is interpreted using a handwriting recognition system or method.

One application of handwriting recognition in portable computing devices, such as smartphones, phablets and tablets, is in note taking. This particularly occurs in education and business settings where the user of the computing device captures notes, for example, during a lecture or meeting. This is usually done by the user launching a handwritten note taking application on the computing device which accepts and interprets, either locally in the device or remotely via a communications link of the device, handwritten notes input on the touch sensitive surface. Conventionally such handwritten note taking applications provide recognition of handwriting and conversion of the recognized handwriting, so-called digital ink, into typeset text. The Applicant has found that when using handwriting note taking applications users typically desire real-time feedback of the recognition, that is during writing. Some conventional applications provide such feedback mechanisms to users but these are generally limited in their effectiveness or are cumbersome in design.

For example, available handwritten note taking applications provide feedback by typesetting the handwritten input automatically (e.g., on-the-fly). This is typically done by displaying the typeset text in a window or dedicated portion of the device display which is separate from the interface for handwriting input. However, such systems generally distract users from the flow of input since they must look at different parts of the screen. Other available handwritten note taking applications provide feedback by listing recognition candidates and the like during input. This is also very distracting for users.

It is possible to convert the digital ink into typeset text in situ, e.g., behind the handwriting flow. However, typeset text is generally smaller and more uniform than handwritten text. Accordingly, the relative difference in character, word and line spacing quickly becomes an issue, which makes the recognized text difficult to read and therefore distracting. It is also possible to enable users to manually typeset when desired through menu selections and the input of gestures. However, such manual methods do not provide real-time feedback and the Applicant has found that when using handwriting note taking applications users generally are unable or do not desire to learn specific input methods or gestures that are not natural or intuitive, or to make settings through menus and the like.

Further, the conventional applications do not to provide users with the ability to interact with the input or provide full document creation from the notes taken, since the focus of these applications has primarily been recognition accuracy rather than document creation. Further, the Applicant has found that when using handwriting note taking applications users experience other issues as well, such as, writing notes in multiple languages or input types (e.g., alphanumeric, symbols, equations) and forgetting to change languages or input types via menu selections when writing, and not understanding the constraints on writing dimensions e.g., height, length and amount, imposed by the applications due to display constraints and the like.

SUMMARY

The examples of the present invention that are described herein below provide systems, methods and a computer program product for use in guiding handwriting input to a computing device. The computer program product has a computer usable medium with a computer readable program code embodied therein adapted to be executed to implement the method.

The computing device is connected to an input device in the form of an input surface. A user is able to provide input by applying pressure to or gesturing above the input surface using either his or her finger or an instrument such as a stylus or pen. The present system and method monitors the input strokes.

The computing device has a processor and at least one application for recognizing the handwriting input under control of the processor. The at least one system application is configured to cause display of, on an interactive display of the computer device, a guide element contiguous with at least a portion of display of digital ink corresponding to the handwriting input. The guide element is configured to guide further handwriting input.

Another aspect of the disclosed system and method provides the guide element with a dynamic prompter which dynamically displays typeset ink corresponding to the digital ink recognized from the handwriting input as the handwriting is input. The dynamic prompter may have at least one interactive prompter element, the at least one system application configured to cause a change in at least the typeset ink in response to receiving interaction with the at least one interactive prompter element. The at least one interactive prompter element may be the typeset ink and/or at least one tag related to the typeset ink. The at least one tag may be related to one or more languages of words contained the typeset ink.

Another aspect of the disclosed system and method provides the guide element with a dynamic ruler which dynamically indicates at least one dimension of the digital ink as the handwriting is input. The typeset ink is displayed along at least one dimension of the dynamic ruler. The dynamic ruler may indicate a width of a content block containing the digital ink and includes an interactive ruler element, the at least one system application configured to cause change in at least the width of the content block in response to receiving interaction with the interactive element.

Another aspect of the disclosed system and method provides the guide element with an interactive control element, the at least one system application configured to cause the processor to control the at least one system application in response to receiving interaction with the interactive control element.

BRIEF DESCRIPTION OF THE DRAWINGS

The present system and method will be more fully understood from the following detailed description of the examples thereof, taken together with the drawings. In the drawings like reference numerals depict like elements. In the drawings.

DETAILED DESCRIPTION

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and/or circuitry have been described at a relatively high-level, without detail, in order to avoid unnecessarily obscuring aspects of the present teachings.

Reference to and discussion of directional features such as up, down, above, below, lowest, highest, horizontal, vertical, etc., are made with respect to the Cartesian coordinate system as applied to the input surface on which the input to be recognized is made. Further, the use of the term 'text' in the present description is understood as encompassing all alphanumeric characters, and strings thereof, in any written language and common place non-alphanumeric characters, e.g., symbols, used in written text. Furthermore, the term 'non-text' in the present description is understood as encompassing freeform handwritten content and rendered text and image data, as well as non-alphanumeric characters, and strings thereof, and alphanumeric characters, and strings thereof, which are used in non-text contexts.

The various technologies described herein generally relate to capture, processing and management of handwritten content on portable and non-portable computing devices in a manner which allows conversion of that content into publishable documents. The systems and methods described herein may utilize recognition of users' natural writing or drawing styles input to a computing device via an input surface, such as a touch sensitive screen, connected to, or of, the computing device or via an input device, such as a digital pen or mouse, connected to the computing device. Whilst the various examples are described with respect to recognition of handwriting input using so-called online recognition techniques, it is understood that application is possible to other forms of input for recognition, such as offline recognition in which images rather than digital ink are recognized.

Figure 1:
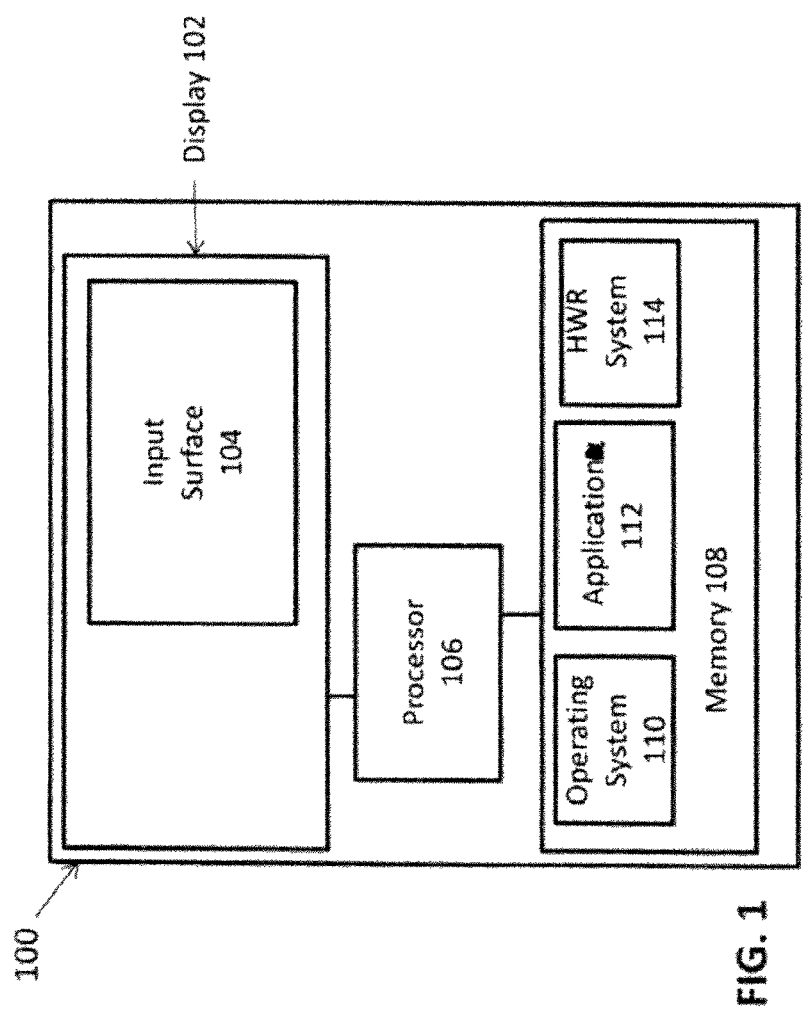
FIG. 1 shows a block diagram of a computing device in accordance with an example of the present system and method.

FIG. 1 shows a block diagram of an example computing device 100. The computing device may be a computer desktop, laptop computer, tablet computer, e-book reader, mobile phone, smartphone, wearable computer, digital watch, interactive whiteboard, global positioning system (GPS) unit, enterprise digital assistant (EDA), personal digital assistant (PDA), game console, or the like. The computing device 100 includes components of at least one processing element, some form of memory and input and/or output (I/O) devices. The components communicate with each other through inputs and outputs, such as connectors, lines, buses, cables, buffers, electromagnetic links, networks, modems, transducers, IR ports, antennas, or others known to those of ordinary skill in the art.

The computing device 100 has at least one interactive display 102 for outputting data from the computing device such as images, text, and video. The display 102 may use LCD, plasma, LED, iOLED, CRT, or any other appropriate technology that is or is not touch sensitive as known to those of ordinary skill in the art. At least some of the display 102 is co-located with at least one input surface 104. The input surface 104 may employ technology such as resistive, surface acoustic wave, capacitive, infrared grid, infrared acrylic projection, optical imaging, dispersive signal technology, acoustic pulse recognition, or any other appropriate technology as known to those of ordinary skill in the art to receive user input. The input surface 104 may be bounded by a permanent or video-generated border that clearly identifies its boundaries.

In addition to the input surface 104, the computing device 100 may include one or more additional I/O devices (or peripherals) that are communicatively coupled via a local interface. The additional I/O devices may include input devices such as a keyboard, mouse, scanner, microphone, touchpads, bar code readers, laser readers, radio-frequency device readers, or any other appropriate technology known to those of ordinary skill in the art. Further, the I/O devices may include output devices such as a printer, bar code printers, or any other appropriate technology known to those of ordinary skill in the art. Furthermore, the I/O devices may include communications devices that communicate both inputs and outputs such as a modulator/demodulator (modem; for accessing another device, system, or network), a radio frequency (RF) or other transceiver, a telephonic interface, a bridge, a router, or any other appropriate technology known to those of ordinary skill in the art. The local interface may have additional elements to enable communications, such as controllers, buffers (caches), drivers, repeaters, and receivers, which are omitted for simplicity but known to those of skill in the art. Further, the local interface may include address, control, and/or data connections to enable appropriate communications among the other computer components.

The computing device 100 also includes a processor 106, which is a hardware device for executing software, particularly software stored in the memory 108. The processor can be any custom made or commercially available general purpose processor, a central processing unit (CPU), a semiconductor based microprocessor (in the form of a microchip or chipset), a macroprocessor, microcontroller, digital signal processor (DSP), application specific integrated circuit (ASIC), field programmable gate array (FPGA) or other programmable logic device, discrete gate or transistor logic, discrete hardware components, state machine, or any combination thereof designed for executing software instructions known to those of ordinary skill in the art. Examples of suitable commercially available microprocessors are as follows: a PA-RISC series microprocessor from Hewlett-Packard Company, an 80×86 or Pentium series microprocessor from Intel Corporation, a PowerPC microprocessor from IBM, a Sparc microprocessor from Sun Microsystems, Inc., a 68xxx series microprocessor from Motorola Corporation, DSP microprocessors, or ARM microprocessors.

The memory 108 can include any one or a combination of volatile memory elements (e.g., random access memory (RAM, such as DRAM, SRAM, or SDRAM)) and nonvolatile memory elements (e.g., ROM, EPROM, flash PROM, EEPROM, hard drive, magnetic or optical tape, memory registers, CD-ROM, WORM, DVD, redundant array of inexpensive disks (RAID), another direct access storage device (DASD)). Moreover, the memory 108 may incorporate electronic, magnetic, optical, and/or other types of storage media. The memory 108 can have a distributed architecture where various components are situated remote from one another but can also be accessed by the processor 106. Further, the memory 108 may be remote from the device, such as at a server or cloud-based system, which is remotely accessible by the computing device 100. The memory 108 is coupled to the processor 106, so the processor 106 can read information from and write information to the memory 108. In the alternative, the memory 108 may be integral to the processor 106. In another example, the processor 106 and the memory 108 may both reside in a single ASIC or other integrated circuit.

The software in the memory 108 includes an operating system 110 and an application 112. The software optionally further includes a handwriting recognition (HWR) system 114 which may each include one or more separate computer programs. Each of these has an ordered listing of executable instructions for implementing logical functions. The operating system 110 controls the execution of the application 112 (and the HWR system 114). The operating system 110 may be any proprietary operating system or a commercially available operating system, such as WEBOS, WINDOWS®, MAC and IPHONE OS®, LINUX, and ANDROID. It is understood that other operating systems may also be utilized.

The application 112 includes one or more processing elements related to detection, management and treatment of the layout of user input (discussed in detail later). The software may also include one or more other applications related to handwriting recognition, different functions, or both. Some examples of other applications include a text editor, telephone dialer, contacts directory, instant messaging facility, computer-aided design (CAD) program, email program, word processing program, web browser, and camera. The application 112, and the other applications, include program(s) provided with the computing device 100 upon manufacture and may further include programs uploaded or downloaded into the computing device 100 after manufacture.

The HWR system 114, with support and compliance capabilities, may be a source program, executable program (object code), script, application, or any other entity having a set of instructions to be performed. When a source program, the program needs to be translated via a compiler, assembler, interpreter, or the like, which may or may not be included within the memory, so as to operate properly in connection with the operating system. Furthermore, the handwriting recognition system with support and compliance capabilities can be written as (a) an object oriented programming language, which has classes of data and methods; (b) a procedure programming language, which has routines, subroutines, and/or functions, for example but not limited to C, C++, Pascal, Basic, Fortran, Cobol, Perl, Java, Objective C, Swift, and Ada; or (c) functional programing languages for example but no limited to Hope, Rex, Common Lisp, Scheme, Clojure, Racket, Erlang, OCaml, Haskell, Prolog, and F#. Alternatively, the HWR system 114 may be a method or system for communication with a handwriting recognition system remote from the device, such as server or cloud-based system, but is remotely accessible by the computing device 100 through communications links using the afore-mentioned communications I/O devices of the computing device 100. Further, the application 112 and the HWR system 114 may operate together or be combined as a single application.

Strokes entered on or via the input surface 104 are processed by the processor 106 as digital ink. A user may enter a stroke with a finger or some instrument such as a pen or stylus suitable for use with the input surface. The user may also enter a stroke by making a gesture above the input surface 104 if technology that senses motions in the vicinity of the input surface 104 is being used, or with a peripheral device of the computing device 100, such as a mouse or joystick. A stroke is characterized by at least the stroke initiation location, the stroke termination location, and the path connecting the stroke initiation and termination locations. Because different users may naturally write the same object, e.g., a letter, a shape, a symbol, with slight variations, the HWR system accommodates a variety of ways in which each object may be entered whilst being recognized as the correct or intended object.

Figure 2:
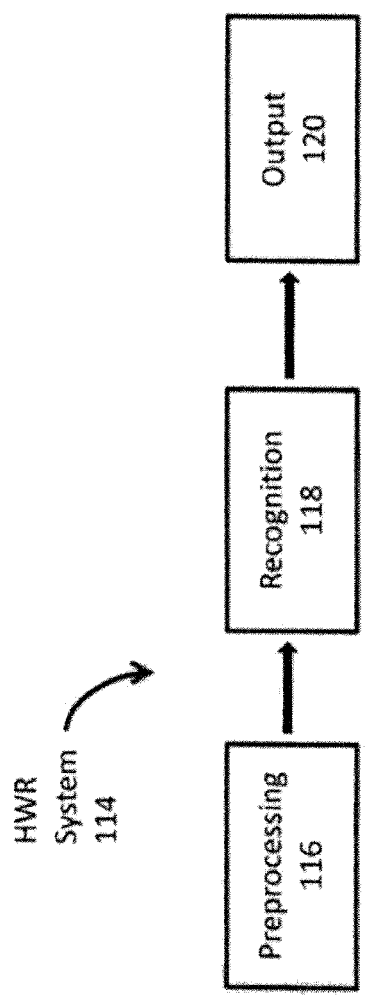
FIG. 2 shows a block diagram of a system for handwriting recognition in accordance with an example of the present system and method.

FIG. 2 is a schematic pictorial of an example of the HWR system 114, in either its local (i.e., loaded on the device 100) or remote (i.e., remotely accessible by the device 100) forms. The HWR system 114 includes stages such as preprocessing 116, recognition 118 and output 120. The preprocessing stage 116 processes the digital ink to achieve greater accuracy and reducing processing time during the recognition stage 118. This preprocessing may include normalizing of the path connecting the stroke initiation and termination locations by applying size normalization and/or methods such as B-spline approximation to smooth the input. The preprocessed strokes are then passed to the recognition stage 118 which processes the strokes to recognize the objects formed thereby. The recognized objects are then output 120 to the display 102 generally as a typesetted version of the handwritten elements/characters.

Figure 3:
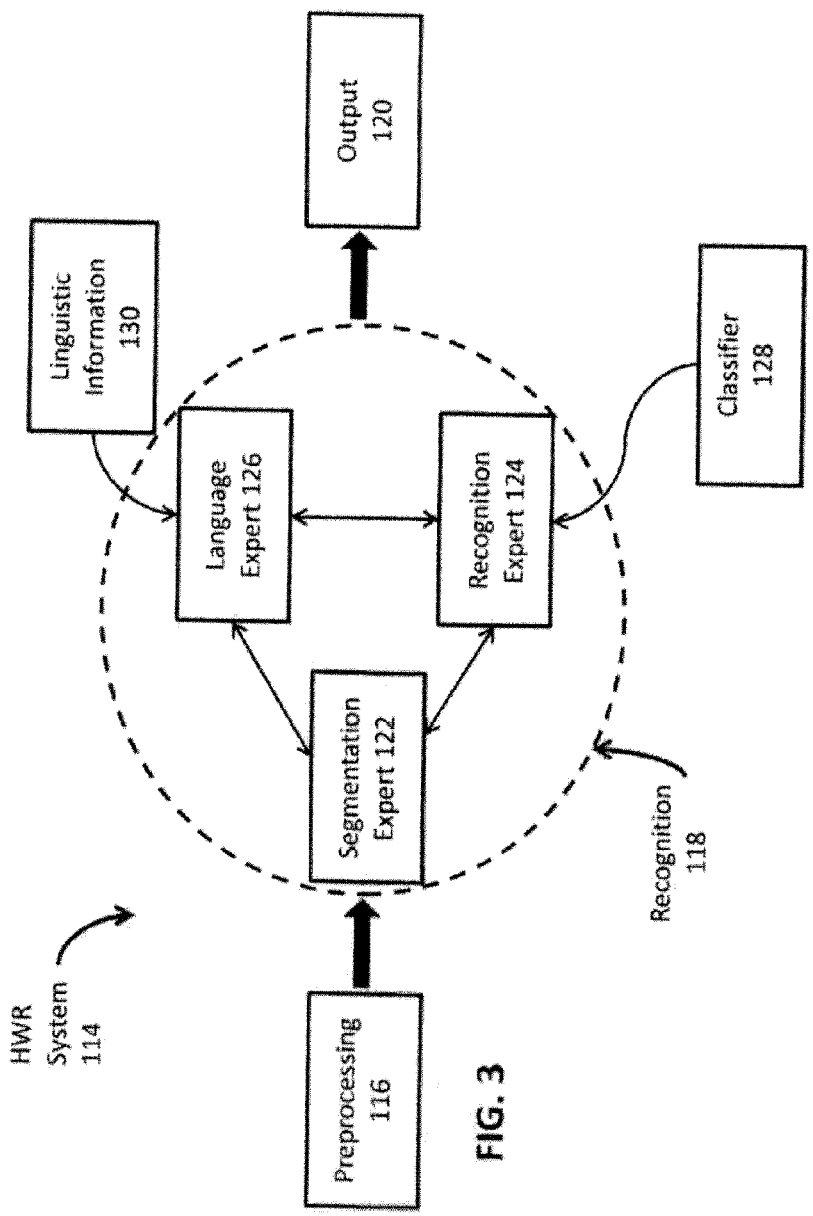
FIG. 3 shows a block diagram illustrating detail of the handwriting recognition system of FIG. 2 in accordance with an example of the present system and method.

The recognition stage 118 may include different processing elements or experts. FIG. 3 is a schematic pictorial of the example of FIG. 2 showing schematic detail of the recognition stage 118. Three experts, a segmentation expert 122, a recognition expert 124, and a language expert 126, are illustrated which collaborate through dynamic programming to generate the output 120.

The segmentation expert 122 defines the different ways to segment the input strokes into individual element hypotheses, e.g., alphanumeric characters and mathematical operators, text characters, individual shapes, or sub expression, in order to form expressions, e.g., words, mathematical equations, or groups of shapes. For example, the segmentation expert 122 may form the element hypotheses by grouping consecutive strokes of the original input to obtain a segmentation graph where each node corresponds to at least one element hypothesis and where adjacency constraints between elements are handled by the node connections. Alternatively, the segmentation expert 122 may employ separate experts for different input types, such as text, drawings, equations, and music notation.

The recognition expert 124 provides classification of the features extracted by a classifier 128 and outputs a list of element candidates with probabilities or recognition scores for each node of the segmentation graph. Many types of classifiers exist that could be used to address this recognition task, e.g., Support Vector Machines, Hidden Markov Models, or Neural Networks such as Multilayer Perceptrons, Deep, Convolutional or Recurrent Neural Networks. The choice depends on the complexity, accuracy, and speed desired for the task.

The language expert 126 generates linguistic meaning for the different paths in the segmentation graph using language models (e.g., grammar or semantics). The expert 126 checks the candidates suggested by the other experts according to linguistic information 130. The linguistic information 130 can include a lexicon, regular expressions, etc. The language expert 126 aims at finding the best recognition path. In one example, the language expert 126 does this by exploring a language model such as final state automaton (determinist FSA) representing the content of linguistic information 130. In addition to the lexicon constraint, the language expert 126 may use statistical information modeling for how frequent a given sequence of elements appears in the specified language or is used by a specific user to evaluate the linguistic likelihood of the interpretation of a given path of the segmentation graph.

The present system and method make use of the HWR system 114 in order to recognize handwritten input to the device 100. As mentioned earlier, the application 112 includes application(s) for handling the layout of the recognized user input. Such applications may be provided in an architecture with separate layers for handling different processing. One or more of these layers may be remote to the device 100 accessible via the communications channels mentioned earlier. The layers may include application wrapper(s), platform wrapper(s) and (platform specific) application user interface(s).

The application 112 provided by the present system and method allows users to handwrite content using the computing device 100. In particular, the application 112 allows users, such as students, academic and working professionals, to take handwritten notes, such as during lectures, meetings and brainstorming sessions, which they can transform into sharable formatted documents on their computing devices. The present system and method further allow natural writing to be input since the writing is made on (ruled) lines, and paragraphs and other layout elements are respected. Synchronization of the captured notes between devices and auto-saving of notes are also supported. Typesetting of the handwritten notes, via the HWR system, is also supported and live recognition feedback which is not distracting to the users handwriting input is effectively provided. Searching of both the recognized typeset text and the digital ink, such as with the systems and methods described in US Patent Application Publication US 2009/0077053 assigned to the present Applicant, the entire contents of which is incorporated by reference herein, is also supported, including index-ation-on-the-fly. Export options to various formats, such as a text, Latex, HTML, image, pdf, etc., is also supported. These and other aspects are now described.

The application 112 utilizes a framework for the definition and handling of documents and document elements so as to provide structured content allowing handling of note taking elements, such as paragraphs and non-text input. The document model handles these different types of document elements, which are best described with HTML5 reference, for example, see W3C HTML5 DOM—Kinds of content: http://www.w3.org/TR/html5/dom.html#kinds-of-content. The document model utilized by the application 112 does not reproduce HTML specifications, rather it takes inspiration from them.

The Applicant has found that users of existing digital note taking applications have issues understanding how text behaves when editing, with text reflow and uncontrolled text/object position. In order to lower the learning curve for use of such applications, handwriting should be closer to what users are familiar with. That is, writing with keyboard in text editing software/web services, with the same model and behaviors. Users also want the result of the handwriting recognition as they input the handwriting but they must be able to write naturally with minimum distraction. Any digital device user is already accustomed to types of recognition feedback, such as predictive text candidates and the like, but the display mechanism of such feedback must not upset the users' writing flow.

Figure 4:
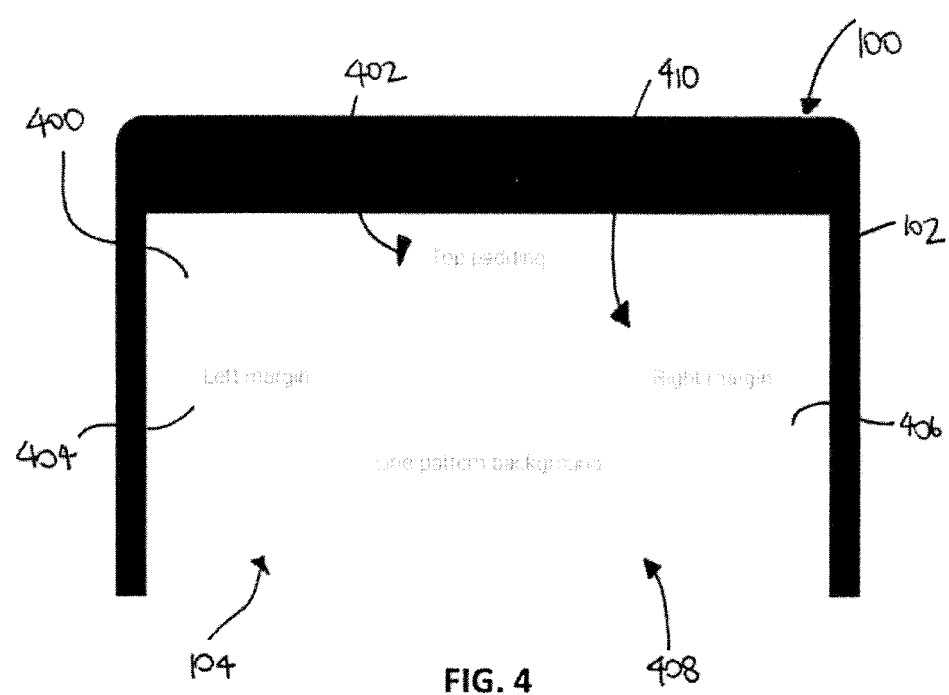
FIG. 4 shows a schematic view of an example visual rendering of a scrollable page on a portion of an input surface of the computing device.

These and other features of the present system and method are now described in detail. FIG. 4 shows a schematic view of an example visual rendering of a note taking page 400 on a portion of the input surface 104 of an example computing device 100. The page 400 is shown in editing view in which all content input is performed. Other views may be used for document structure editing and notebook navigation. Besides providing user interface (UI) controls (described later), the main object of the editing view is to provide a full-width page that overflows vertically from the display 102 of the device 100. The page 400 embodies a page of flexible height, in essence of infinite height, and can be vertically scrolled using well understood touch screen computing device gestures or non-touch screen computing device methods, such as a with a mouse. In order to maximize writing space for users (particularly on smaller devices), an empty scrollable page is defined to occupy at least the whole editing view height.

In the editing view (and other views as appropriate) several page elements are displayed including a top padding 402, a left margin 404 and a right margin 406. The padding and margins define an input area 408 which has a line pattern background 410. The line pattern 410 has horizontal lines separated by a multiple of the vertical rhythm height unit being the density independent pixel (dp). Regardless of the particular device 100, the vertical distance between the horizontal lines 410 is defined by a line pattern unit (LPU) and the vertical rhythm height unit provides a graduated measure of the LPU on a particular device. For example, the LPU may be set at about one centimeter for any device being a certain multiple of the vertical rhythm height unit or users may be allowed to customize the line pattern unit to a different multiple of the vertical rhythm height unit according to their writing style. Alternatively, the vertical rhythm may be based on typeset text size (e.g., the minimum text size) and the LPU is provided as a multiple of this typeset text size. All lines 410 are displayed with the same very light and subtle color, e.g., grey, that is just between visible and faded. In this way the line pattern is noticeable but unobtrusive so as to guide the handwriting input without distracting from the note taking itself. The line pattern background 410 is displayed in handwritten text context and serves multiple purposes:
  forces users to write onto it so that handwriting recognition is optimized
  helps users adopt regular vertical rhythm writing leading to same writing size and better block dimensions and positions
  helps users control line skipping to define paragraphs (described later).

The top padding 402 is displayed on any new page or section and does not contain the line pattern background. This helps users write with proper vertical spacing, i.e., not too close from the interface 104 border and leaves room for other elements, such as section titling and tagging. The top padding 402 is defined by multiples of the LPU, e.g., in the example of FIG. 4 the top padding is two times the LPU.

The left and right margins 404 and 406 are displayed with vertical lines. In the example of FIG. 4 these lines are similar to the line pattern 410 in color and definition, however these lines may be more boldly displayed if desired. The vertical line margins are positioned from the corresponding left and right 'page' edges by multiples of the vertical rhythm unit. In the example of FIG. 4, the margins 404, 406 are not displayed in the top padding 402 and start from the first line pattern 410 horizontal line. However, the margins may extend into the top padding if desired. Further, the line pattern 410 is not displayed in the margin elements in order to discourage writing in these areas. However, it may be desired to allow writing in the margins for annotations and the like. Alternatively, the margins may only be displayed on hover-over or contact interaction with the horizontal extents of the page 400 or totally omitted, thereby, for example, relying on natural handwriting behaviors of users to not write too close to the screen/UI edges.

With this basic structure of the document model the present system and method provides a mechanism for guiding users handwritten input, to optimize recognition. This mechanism can be further used to provide real-time recognition feedback to users which does not distract from, but enhances, the input of handwriting. This is achieved by providing a guide element which includes a dynamic ruler and a dynamic prompter. The prompter is used to dynamically display a certain number of last recognized words as typeset ink of a current sentence or paragraph (or characters/symbols of a current input string if the handwritten input is non-text). The ruler is configured to provide horizontal delimitation for handwriting and dynamically grows as strokes are handwritten in the input area 408 and/or typeset ink is rendered along one of the lines 410 to be displayed as digital ink.

The guide element is described below with reference to FIGS. 5 to 18. The examples shown in these drawings are in a left-to-right written language context, and therefore any reference to positions can be adapted for written languages having different directional formats. In each of FIGS. 5 to 18 part of the scrollable page 400 is shown in schematic form as depicted in the viewable area of the device interface. The scrollable page 400 is shown with the line pattern background 410.

Figure 5:
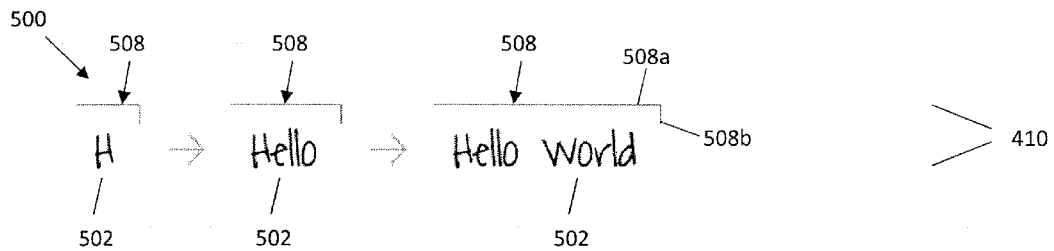
FIG. 5 shows a schematic view of an example visual rendering of a part of a scrollable page with sequential handwritten input of a paragraph guided by a guide element.
Figure 6:
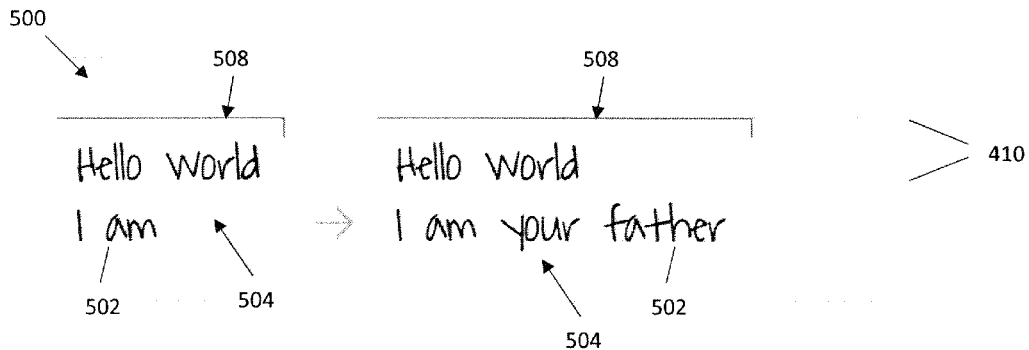
FIG. 6 shows schematic views of the scrollable page of FIG. 5 with further sequential handwritten input of the paragraph guided by the guide element.
Figure 7:
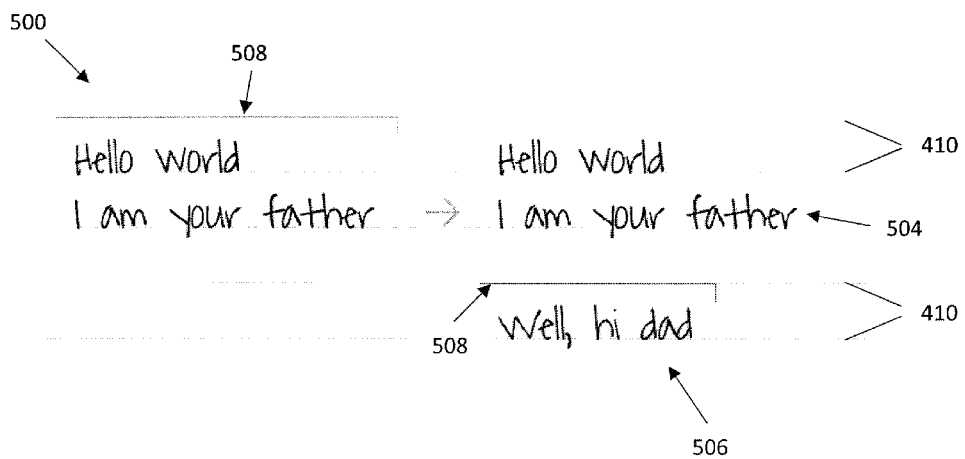
FIG. 7 shows schematic views of the scrollable page of FIG. 6 with further sequential handwritten input of another paragraph guided by the guide element.

FIGS. 5 to 7 show a guide element 500 in relation to the sequential handwritten input of characters 502 of words into two paragraphs 504 and 506 on a portion of the line pattern 410 of the page 400. Upon detection of the beginning of handwriting and the rendering of the corresponding digital ink on the input area 408 of the interface 104 (in a manner previously described), the present system and method also displays the guide element 500 as a horizontal bar 508 contiguous with and above the handwritten characters on the line 410 of the line pattern background directly above the line 410 on which the characters 502 are input. As can be seen in the example of FIG. 5, the horizontal bar 508 of the guide element 500 is dimensioned coextensively with the input and is configured to dynamically grow with the input as characters 502 are added to the line 410. The horizontal bar 508 is displayed with a very light and subtle color, e.g., blue or at least a different shade of the color used for the line pattern background or digital ink, that is just between visible and faded, less bold than the digital ink but bolder than the line pattern background. In this way the guide element is noticeable (more noticeable than the line pattern background) but unobtrusive so as to guide the handwriting input without distracting from the note taking itself.

As can be seen in FIG. 6, the horizontal bar 508 of the guide element 500 remains on the line 410 above the first line 410 of input in the multiline paragraph 504 and grows as the horizontal width of the paragraph grows on any line of the paragraph 504. In this way, the guide element 500 is contiguous and coextensive with the paragraph itself since it is aligned with the leftmost paragraph position, extends to the rightmost paragraph position and is vertically aligned with the line pattern background to provide users with an upper writing boundary. This ensures that users input properly sized characters (e.g., not excessively higher than a single LPU). Alternatively, the guide element can be displayed in different positions relative to a paragraph, for example, as a simple vertical line beside the leftmost paragraph position starting from the first line of input to the last line of input in the paragraph. Further, the guide element can be configured to extend in both the horizontal and vertical directions about a paragraph/content block. In either case, the guide element provides users with a visual indication of a paragraph's dimensions throughout input in that paragraph.

In FIG. 7, the second paragraph 506 is begun two lines 410 below the last line 410 of the paragraph 504. Accordingly, the display of the guide element 500 above the paragraph 504 is terminated, as input is no longer being carried out in this paragraph, and the guide element 500 is displayed on the line 410 above the first line 410 of the new paragraph 506 in the same manner as described earlier.

In the example of FIG. 6, the input added to the paragraph 504 is a continuation of the text of the paragraph onto the next line of the line pattern background 410. It is considered that the added text belongs to the existing paragraph since it is added to the immediate next line 410 in the vertical flow of the page 400. Determination of the added text actually being part of a new paragraph could be made using the recognition stage 118 of the HWR system 114, particularly with reference to the offset of the text of the adjacent lines and their relationship to the left margin or aligned edge of the (existing) paragraph.

Display of the guide above the new paragraph line could be used to indicate the result of such recognition to users, so that if the new paragraph is misrecognized, some correction action could be taken by users, such as merging the paragraphs. However, in the example rendering of the drawings, this would require display of the guide element overlaying the last line of text of the paragraph therefore obscuring that text or making the guide element difficult to see and therefore distracting for the user. The vertical display of the guide element mentioned above would obviate this undesired overlay, however the use of a horizontal guide has other benefits, as described later.

Accordingly, a simple constraint is placed on the input of separate paragraphs in the vertical flow of the page, in a manner which is easily understood and applied by users. This constraint is that there is always to be an empty line 410 between paragraphs, e.g., a spacing of two LPUs, which overlap horizontally, as has been done in the example of FIG. 7. This rule provides a way of cleanly maintaining relative layout between paragraphs in the vertical flow of the page which can be applied to directly input content and dragged & dropped or pushed & dropped paragraphs, and also provides clear display of the guide element above an active paragraph (e.g., a paragraph in which input is being created or that is selected for interaction).

Figure 8:
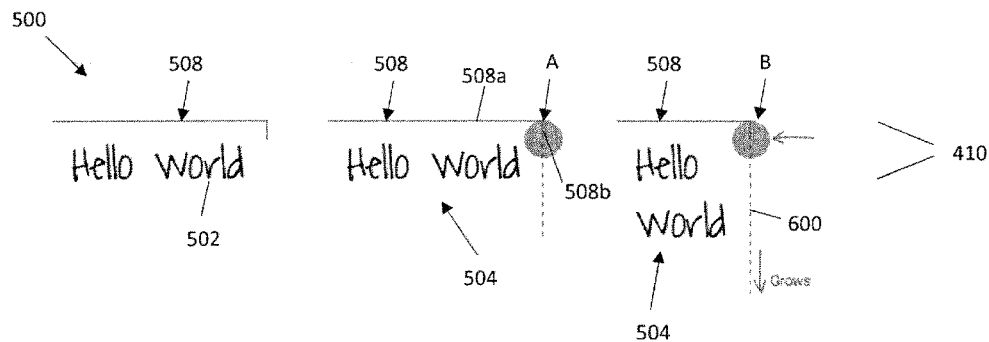
FIG. 8 shows schematic views of an example visual rendering of a part of a scrollable page with sequential paragraph resizing interaction with the guide element.

FIG. 8 shows the paragraph 504 with the content depicted in the final input stage of FIG. 5. As illustrated in FIG. 8 the horizontal bar 508 of the guide element 500 is configured with a horizontal (first) line 508a and a vertical (second) line 508b which projects downwards from the rightmost end of the horizontal line 508a. The horizontal line 508a is the portion of the guide element 500 which grows as the paragraph width grows, and as such acts as an indicator of the width of an object block (e.g., a paragraph). The vertical line 508b is a portion of the guide element 500 which provides users with a visual clue as to where the block/paragraph ends along the width of the page. Accordingly, the horizontal and vertical lines 508a and 508b provide the guide bar 508 as a ruler of the paragraph/content block width.

The vertical line 508b of the ruler 508 may also provide a control feature for the block/paragraph as it can be used as an interactive ruler element for the block, such as a resizing handle. For example, in FIG. 8 in response to receiving a single-point or multi-point gesture A (such as a single tap, long press or double tap gesture made using a finger or stylus touching or hovering over the interface 104) the paragraph 504 is selected by the application 112 (which selection can be displayed to users as detailed later). Then, in response to receiving a further gesture B (such as a drag or push if the gesture A was a press, or a press and drag or push) the paragraph 504 is resized with consequential reflow of the content of the block, resizing of the horizontal line 508a and, if desired, display of a resizing guide.

In FIG. 8 the width of the paragraph 504 is made smaller such that the word "world" is reflowed to be on a separate line 410 below the first line 410 of the paragraph 504 causing the width indicator 508a of the ruler 508 to decrease in size and a resizing guide 600 to be displayed as the paragraph is resized on the right of the paragraph 504 (shown as a dashed line) starting from the line 410 of the guide element 500 and extending down to the next available line 410 under the last line 410 of the paragraph 504. The vertical line 508b of the ruler 508 may be rendered larger, smaller or differently than as depicted in the drawings, so long as it is able to be interacted with as described without distracting users from content input. Alternatively, the vertical line 508b may only be displayed on hover-over or contact interaction with the ruler or totally omitted, thereby, for example, relying upon natural behaviors of users to interact with the horizontal line 508a of the guide element directly to perform manipulations. Further, if multiple paragraphs are selected at once, using selection mechanisms available in the application 112, the guide element may be replaced by a toolbar associated with all the selected paragraphs during this selection.

Another beneficial aspect of the horizontally disposed guide element is the provision of a prompter 510 above the active paragraph/block for real-time content recognition feedback as illustrated in FIGS. 9 to 12. As previously discussed, a drawback with available handwritten note taking applications is the lack of effective handwriting recognition feedback for users, such that users have no way to verify recognition accuracy before export of the notes to document processing applications. Some available applications provide an export view of the recognized text/content in which changes and corrections to the recognition can be made prior to export. However, any such corrections are only made within the export view and are not reflected in the digital ink of the notes itself.

Figure 9:
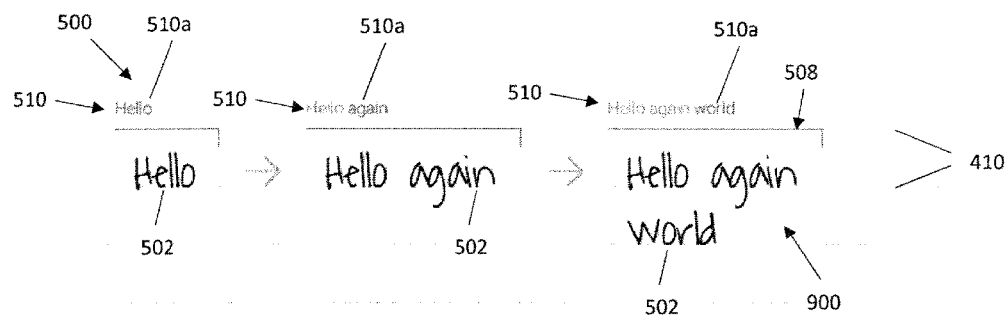
FIG. 9 shows schematic views of an example visual rendering of a part of a scrollable page with sequential handwritten input of a paragraph and consequential display of typeset text by the guide element.

The prompter 510 provides real-time feedback of the recognized content in the editing view as a single line view displayed on top of the horizontal line 508a of the guide element 500 as typeset ink. FIG. 9 shows the sequential handwritten input of characters 502 of words into a paragraph 900 on a portion of the line pattern 410 of the page 400. As before, the guide element 500 is generated and displayed during input of the characters 502. The prompter 510 of the guide element 500 displays recognized words 510a of the paragraph 900 as the HWR system 114 provides the output 120. Thus, during input the prompter 510 displays any newly recognized words above the horizontal bar 508 from the left-aligned extent of the bar 508.

This display is performed in a way to minimize distracting the users' input whilst providing a live visual indication of the recognition of their handwriting. For example, each newly recognized word may be displayed using typeset of a first weight and/or color, such as blue with a weight less than that used for the digital ink, then after a short period of time (e.g., within about half a second to about one second) if no new words are recognized or quickly (e.g., almost instantly) if a newly recognized word is input, the previously recognized word is re-displayed using typeset of a second weight less than the first weight and/or color different than, or at least a different shade of, the first color. The display and the re-display may be made with subtle animation, such as fade-in.

As can be seen the typeset ink is smaller than the digital ink such that as more content is added to a paragraph on one or more lines, newly recognized words are typeset together with the existing typeset, such that users can easily see both the recognition of individual words and the context of the string or sentence of words. However, as more content is added to a paragraph such that the vertical extent of the paragraph is greater than its horizontal extent, the newly typeset elements will not fit with the already typeset elements in the prompter. This is handled by only allowing overflow of the prompter content to the left and not the right. For example, in FIG. 10 the paragraph 900 has further content 502 added on the second and third lines 410, causing the ruler 508 length, defined as the prompter frame, to be shorter than the length of typeset text, defined as the prompter content. Accordingly, in order to continue displaying newly recognized words 510a to the user using the prompter 510, the prompter content is scrolled to the left pushing the leftmost typeset text from the prompter 510 display (i.e., the first word "Hello" disappears) so that the newly recognized words/content 510a (i.e., the content "you?") can be displayed at the right extent of the prompter frame.

Figure 10:
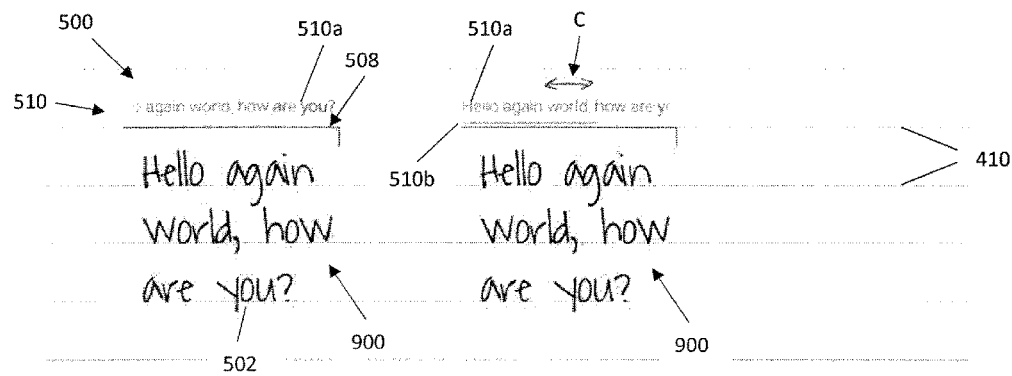
FIG. 10 shows schematic views of an example visual rendering of a part of a scrollable page with typeset text scrolling interaction with the guide element.

This (dynamic or automatic) prompter scrolling can occur either in response to the application 112 determining the newly recognized word has a typeset length that means it would be displayed beyond the current ruler length, e.g., the prompter content will overflow the prompter frame on the right, or as a pre-set scroll when the typeset content reaches a certain position of the current guide element. The prompter and its elements can be further configured to be interactive so that at any time, users may scroll the prompter to review any previously recognized content. This can be done in response to receiving a single-point or multi-point gesture C, such as a swipe as shown in FIG. 10. During such manual scrolling, a scrollbar indicator may be displayed, such as the underline element 510b shown in FIG. 10, which indicates the scrolling behavior. After manual scrolling has occurred, the current prompter scroll position remains until further interaction or until new content is input to the paragraph/ block at which event the prompter scrolls back to its right extent of the prompter frame and adopts the new input behavior.

Figure 11:
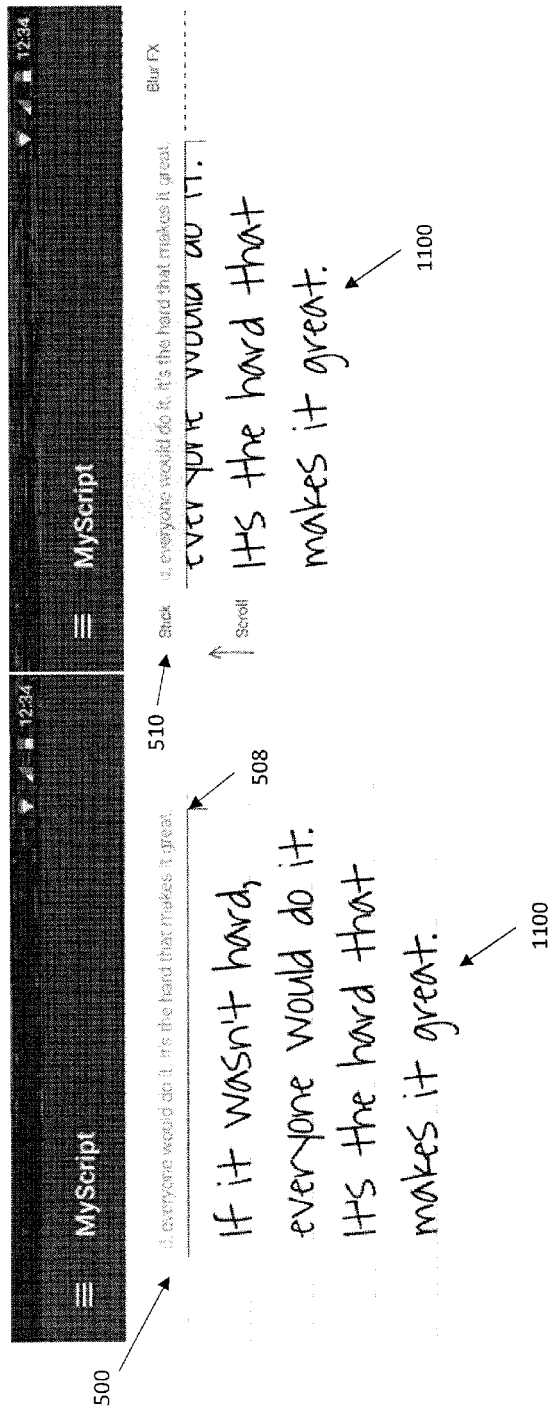
FIG. 11 shows schematic views of an example visual rendering of a part of a scrollable page with digital text scrolling interaction relative to the guide element.

Beyond scrolling of the typeset content of the prompter, the whole content in the input area 408 of the page 400 may be scrolled, as previously discussed. The guide element is therefore scrolled with any current block that is offset from the top/bottom of the page as the page is scrolled. However, in order to maintain the effectiveness of the guide element it is prevented from being pushed out of view when the current block is being scrolled out of the view until the current block is fully pushed out, similar to iOS® "sticky header" behavior. Accordingly, for a current block that is partly visible on the page 400 (e.g., the paragraph is partially overflowing the viewable area of the interface 104), the guide element 'sticks' to topmost position while the block content scrolls underneath and for a current block that is moved from visibility on the page 400 (e.g., the paragraph completely overflows the viewable area of the interface 104), the guide element loses its sticky behavior and scrolls out of viewable area with the last line of block content. FIG. 11 shows an example of this behavior with a paragraph 1100 being scrolled out of view at the top of the page 400 with consequential display effects. As can be seen, during this example scroll operation once the paragraph 1100 reaches the top of the page 400, the guide element 510 occupies and sticks to the top padding area 402 of the page 400.

With the live recognition feedback provided by the prompter, users may notice wrongly recognized words/content. Such misrecognition may occur due to poor quality handwriting, or the mis-selection of recognition candidates or presence of out-of-lexicon words/content as processed by the HWR system 114. Once noticed, users could merely amend the handwriting using handwriting editing gestures, in a manner understood by one of ordinary skill in the art, to correct the mis-recognition. Alternatively or additionally, the HWR system 114 may indicate to the application 112 that the confidence of recognition is low, or the application 112 itself may determine this low confidence. In either case, in an example of the present system and method, the prompter 510 is configured to provide suspect recognized content with dedicated rendering that users readily understand to mean something is incorrect. For example, in FIG. 12 a likely misrecognized word "agan" from a current paragraph 1200 is rendered in the prompter 510 with an underline pattern that may be colored and/or weighted differently than the rest of the prompter content, e.g., a red zig-zag pattern such as that used in text editor applications of mis-spelled words.

Figure 12:
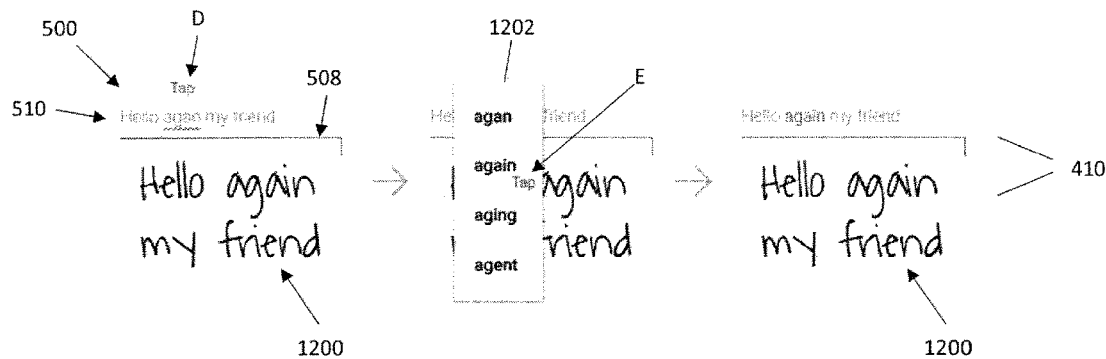
FIG. 12 shows schematic views of an example visual rendering of a part of a scrollable page with sequential typeset text and menu interaction with the guide element.

The prompter can be configured to be further interactive or with interactive prompter elements so that the (highlighted) typeset ink can be selected for correction or for replacement with other or more preferred words directly in the guide element 500 or for any other desired interaction with the typeset ink. This can be done in response to receiving a single-point or multi-point gesture, such as a single tap D as shown in FIG. 12, for example. Upon selection, a menu of other recognition candidates (as populated by the HWR system 114) may be displayed from which the correct candidate can be selected if displayed in response to receiving a single-point or multi-point gesture, such as a single tap E on a candidate menu 1202 as shown in the example of FIG. 12. In FIG. 12 the candidate menu 1202 has a first entry corresponding to the original mis-recognized word followed by the next top three candidate words "again", "aging" and "agent" (as returned by the HWR system 114), the correct word "again" is selected in response to receiving a single tap E on that word, and in response the prompter content is changed to replace "agan" with "again" (with new recognized word rendering; it is noted that the word being checked could also be similarly rendered during the checking process). The result of this process may be communicated back to the HWR system 114 to assist in training the recognition stage 118. During selection and interaction with the typeset ink, the corresponding digital ink may be highlighted in a manner similar to the selected typeset ink. It can be seen that by this process however the digital ink is not changed since the user did not interact with the handwritten content but with the recognition feedback. However, interaction directly with the digital ink is also possible to perform editing and the like.

Figure 13:
FIG. 13 shows schematic views of an example visual rendering of a part of a scrollable page with sequential digital ink interaction and consequential rendering of the guide element.

Editing of the digital ink of course has consequence on the recognized text displayed in the prompter. When users select handwriting content, the prompter should reflect this sub-context and adapt its content accordingly. FIG. 13 shows the paragraph 900 of FIG. 10 with the corresponding recognized word display in the prompter 510. The word "world" of the paragraph 900 is selected for interaction in response to receiving a single-point or multi-point gesture, such as a long press F. In response to this selection the prompter 510 is scrolled horizontally (if necessary, e.g., if the selected word(s) is out of the current prompter frame) to reposition itself on the recognized word(s) corresponding to the selected word(s), with some afore-described color/weight highlighting and/or removal of all other prompter content, as shown in FIG. 13 with the recognized word "world" remaining in the prompter 510. Alternatively, all typeset ink other than the typeset ink corresponding to the selected word(s) is omitted from the prompter display. In this way, the recognized content corresponding to the selected digital ink for editing/manipulation (which can be highlighted as shown with known selection handles, etc.) can be easily ascertained by users during editing. If the selection is extended (e.g., the selection handles are dragged/pushed), the prompter content is updated accordingly.

When the selection mode is exited the prompter content returns to displaying the full prompter content within the current prompter frame. If the selected digital ink is deleted, then the corresponding recognized content is also deleted with some animation (e.g., fading out of the removed characters/words) and re-display or translation of the remaining prompter content to fill the space left. If selected digital ink is overwritten or otherwise replaced, the corresponding previous recognized content is replaced with the newly recognized content with the same animation as the usual recognition update for new prompter content and re-display/translation of the other prompter content.

The prompter of the guide element of the present system and method may be further configured to provide additional feedback and interaction therewith. The HWR system 114 may be capable of recognizing multiple languages on-the-fly. This in part obviates the need for users to pre-select the input language, which is particularly problematic when the languages are being used interchangeably in pages, paragraphs and even sentences. However, such multi-language detection does not necessarily always select the correct language for recognition or reflect the users' intent in writing different languages. The prompter of the guide element can be configured to be greatly useful in indicating this language detection (or manual selection; see below) by displaying multi-language tagging within the prompter content, from which users can ascertain when different recognition languages are being applied to the digital ink content.

Figure 14:
FIG. 14 shows a schematic view of an example visual rendering of a part of a scrollable page with language tagging of the guide element.
Figure 15:
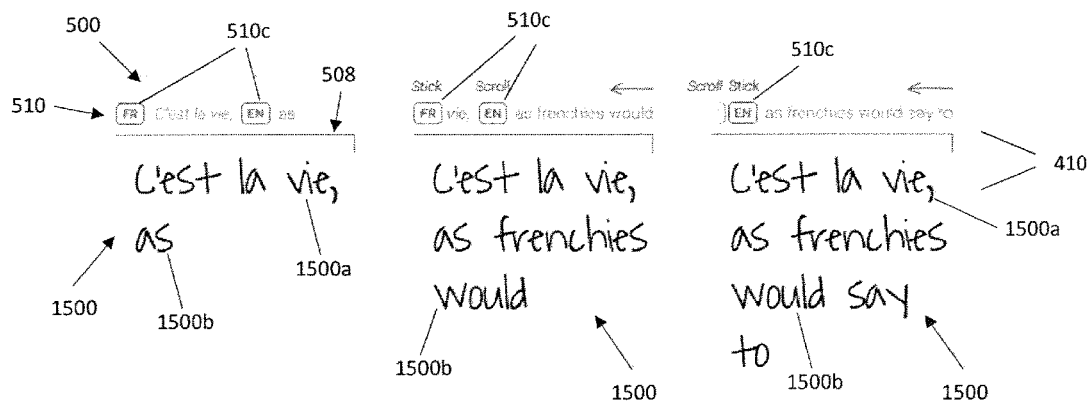
FIG. 15 shows schematic views of an example visual rendering of a part of a scrollable page with sequential handwritten input of a paragraph and consequential rendering of language tagging of the guide element.

FIGS. 14 and 15 show example rendering of the language tagging of the prompter in accordance with an example of the present system and method. FIG. 14 shows digital ink content 1400 containing content 1400a in a first language (i.e., Spanish) and content 1400b in a second language (i.e., English). In the prompter 510 of the guide element 500 the recognition content reflects the recognized languages and displays tags 510c before (e.g., to the left) the recognized languages which indicate the language detected by the HWR system 114. For example, the tag 510c before the Spanish content indicates "ES" and the tag 510c before the English content (e.g., between the Spanish and English content) indicates "EN".

These tags can also be used when users specifically select the language of input, via a menu or the like, such that when switching to another language (e.g., back to a main language of the application 112), another language tag is added to mark both the end of the previous language sequence and the start of the new language. The tags of such main and alternative languages could be rendered with different styling, such as with italicized text for alternative languages. The terms 'main' and 'alternative' reflect the relative sizes and availability of lexicons in the those languages for the HWR system 112, such as through installation to the memory 108 of the device 100, which is generally performed based on the language of the operating system 110. The use of these different lexicons by the HWR system effects the output 120 since the ability of the HWR system to correctly recognize words from a reduced lexicon or from one language with a lexicon of another language is generally severely limited.

In order to maintain the effectiveness of the language tags, the language tags move along inline with the associated prompter content as further digital ink is input and the prompter content scrolls accordingly or when users manually scroll the prompter. When the prompter content overflows the current prompter frame, the language tags mimic iOS® "sticky header" behavior but in a horizontal context. For example, as shown in FIG. 15 a paragraph 1500 of digital ink contains a first language portion 1500a (e.g., French) and a second language portion 1500b (e.g., English) and these are indicated in the content of the prompter 510 with tags 510a (e.g., "FR" and "EN"). As further content is input in the paragraph 1500 in the language portion 1500b, the prompter content is scrolled to the left and once the first tag 510c "FR" reaches the leftmost extent of the promoter frame it sticks to the leftmost position and the text content to its right appears to scroll underneath the 'stuck' tag 510c out of the prompter frame together with scrolling of the other content including the second tag 510c "EN". When the second language tag 510c "EN" is scrolled to 'touch' the stuck language tag 510c "FR", the second tag pushes the first tag out of the prompter frame to the left and takes its sticky position at the leftmost position of the prompter frame.

The language tags may further be an interactive prompter element for selection of a different language for recognition, for example. This is achieved by selection on a tag using a single-point or multi-point gesture, such as a single tap for example, in response to which a menu or the like for other language selection is displayed from which available languages can be selected for re-recognition by the HWR system 114 with subsequent replacement in the prompter content using the new output 120. Such interaction with the language tags could also provide a means to translate the recognized words between languages, for example, using a language translation application accessible to the device 100. Further, the prompter of the guide element according to the present system and method is configurable to display other types of interactive tags for different purposes, such as audio/voice rendering of, or part of, the prompter content typeset from text or music notation handwritten in the application 112 using a suitable application accessible to the device 100, or automatic calculation of, or part of, the prompter content typeset from arithmetical equations handwritten in the application 112 using a calculation application accessible to the device 100.

Figure 16:
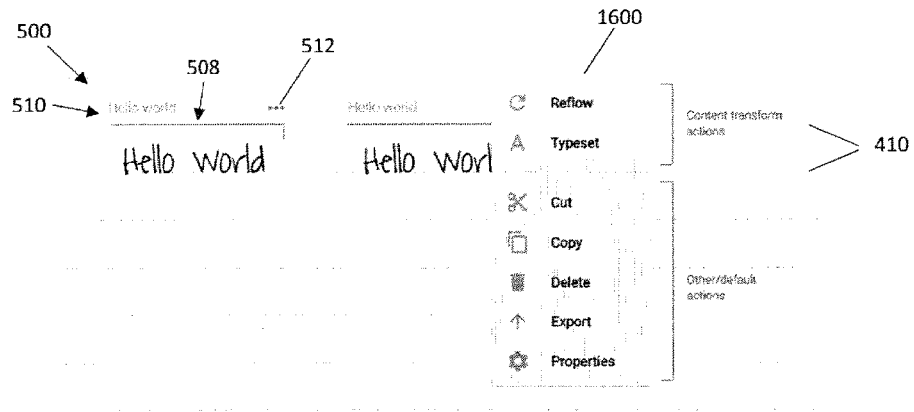
FIG. 16 shows schematic views of an example visual rendering of a part of a scrollable page with sequential icon and menu interaction with the guide element.

A further advantageous application of the guide element of the present system and method is providing users with access to additional interactive control elements of the application 112 via the guide element itself. In this way the control elements are accessible much closer to the content than with the usual mechanisms, such as the top bar of the application. An example of this feature is shown in FIG. 16, in which the guide element 500 includes a control access element 512, displayed as a "more" icon, at the rightmost extent of the prompter frame after (e.g., to the right of) the last recognized word/element. The control access element 512 is interactive through a single-point or multi-point gesture, such as a single tap for example, in response to which a contextual menu is displayed. For example, in FIG. 16 upon selection of the 'more' element 512 a dropdown menu 1600 is displayed which presents all or certain available actions, for example, with clearly identifiable icons and separation into content transform actions (such as reflow and typeset) and standard actions (such as cut, copy, delete). In order to not distract users during content input, the control access element 512 may only be displayed when input is not being performed, For example, immediately at detection of a finger/pen down event the 'more' icon is faded out to an invisible state, during writing the icon is kept invisible and after writing, e.g., at detection of a finger/pen up event plus a predefined time period (e.g., about half a second to about a second) the 'more' icon is faded back into full visibility.

In the examples of the guide element described thus far, the ruler of the guide element is rendered so as to be substantially contiguous with the input content paragraphs/blocks. In other examples the guide element may be configured to adhere to certain features of the document model of the present digital note taking application instead. As described earlier, the scrollable page 400 is defined with the line pattern background 410 to assist users to handwrite cleanly for recognition optimization. This line pattern background also provides a regular vertical spacing of content elements (e.g., by LPUs) to assist with proper document creation from the handwritten notes. As explained, the guide element 500 is also aligned with the line pattern background 410 in relation to each paragraph or block of input content. Like the lines of handwritten content, the guide element height is also controlled by the vertical spacing unit and is one LPU in the examples of the drawings. This provides a clean UI of the application 112 and proper alignment with the line pattern.

With this line pattern, the scrollable page can be provided as either an otherwise constraint-free canvas that allows users to create object blocks (blocks of text, drawings, equations, music notation, etc.) anywhere without worrying about sizing or alignment. In order to provide fluid interaction and let users feel that they are in control of the layout, any move/resize of an object block may be updated in real-time and aligned with current touch or hover position during the interaction. However, in order to provide professionally formatted documents containing structured content, a further alignment pattern may be defined onto which all content is to be aligned/defined (either at input or with user interaction). This alignment pattern is defined to allow proper handling of individual content blocks in relation to one another.

The alignment pattern has padding areas, which are substantially defined within the margins 404 and 406 of the page 400 between which the available horizontal space is defined as the input area for user content. In this way, content is prevented from being input too close to the edges of the interface 104 of the device 100. This input area is divided into a number of columns, which are all the same width and flexible to fill up the input area, and define breakpoints as minimum application width values in dp, e.g., the screen width when the application 112 is provided in full-screen or just window width when reduced, such as on desktop/laptop, or split-screen on tablet. Further, gutter spaces may be defined about each column division to prevent object blocks from being positioned too close to each other.

Snap-to-pattern behavior is used for object block alignment. Vertical snap is handled through reference to the line pattern 410 in two ways, either by making sure that all object block heights are integer multiples of the LPU or at least the top boundary of each block is aligned with the next available line of the line pattern background 410. In the former case, whatever the user interaction (e.g., new, edited, moved, resized), all object blocks are always LPU-rounded and positioned according to vertical LPU (e.g., top and bottom boundaries are aligned with the line pattern background 410). Either way a LPU portion of a snap-to-grid mechanism is provided. For horizontal snap, whatever the user interaction (e.g., new, edited, moved, resized), left and right boundaries of all object blocks stay aligned with the columns (or gutters) of the alignment pattern in any case. This provides a layout portion of the snap-to-grid mechanism. Accordingly, the vertical and horizontal snap operations provide vertical alignment and horizontal alignment to the LPU (vertical) and layout (horizontal) grid.

Figure 17:
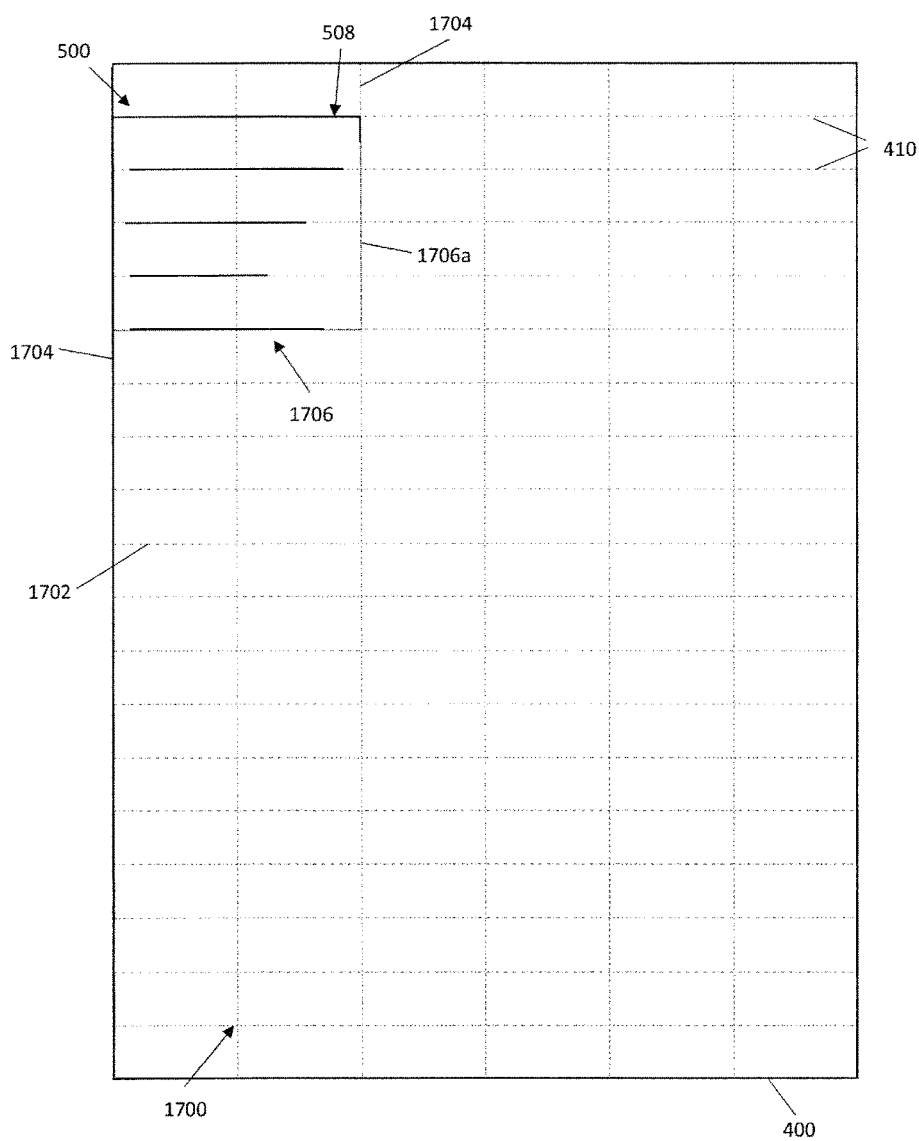
FIG. 17 shows a schematic view of an example of alignment elements of the scrollable page in relation to the guide element.
Figure 18:
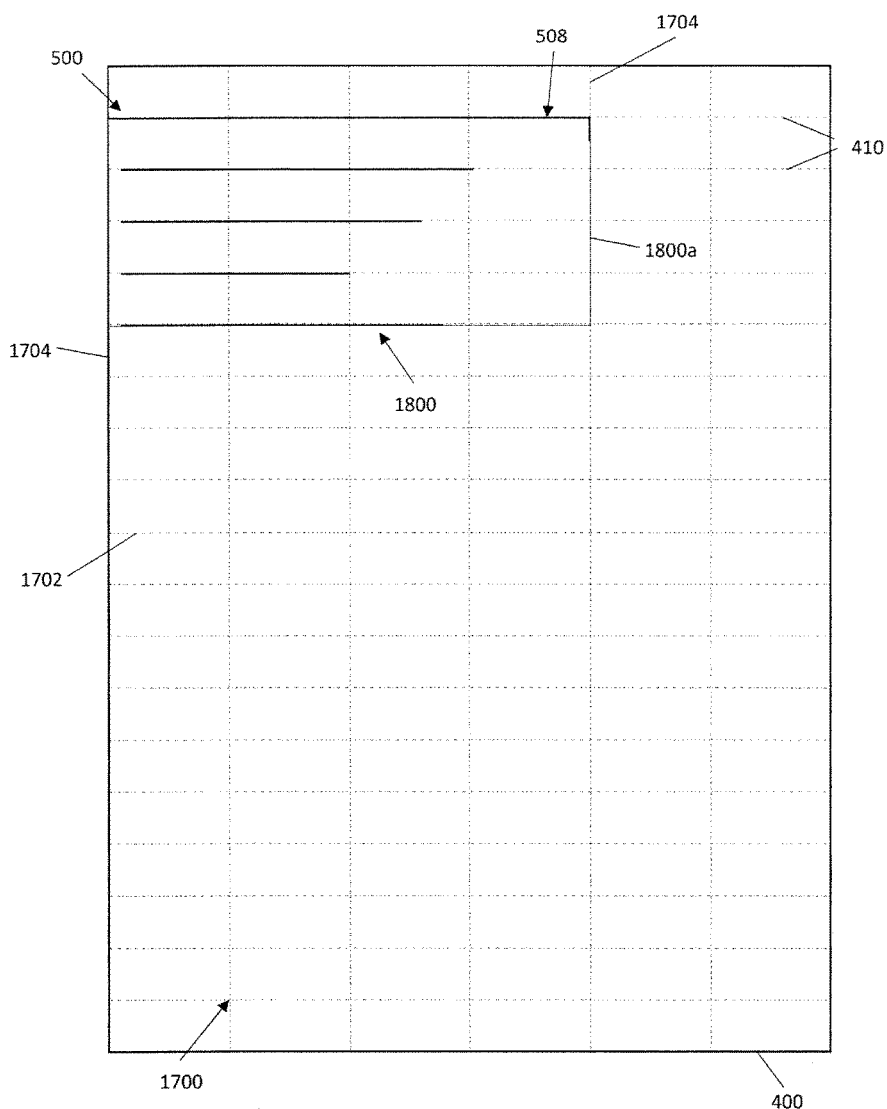
FIG. 18 shows a schematic view of an example of alignment elements of the scrollable page in relation to the guide element.

An example LPU and layout (alignment) grid 1700 is illustrated in FIGS. 17 and 18. In each of FIGS. 17 and 18 part of the scrollable page 400 is shown in schematic form as depicted in the viewable area of the device interface. The scrollable page 400 is shown with the alignment grid 1700 configured from the line pattern background 410, as horizontal lines 1702 (shown divided with dashed lines) of the grid 1700, and the alignment pattern defined by vertical lines 1704 (shown divided with dashed lines) of the grid 1700 which divide the page 400 into a number of columns, e.g., six columns in the drawings. The top padding and margins of the scroll page, and the padding areas and column gutters of the alignment pattern are omitted in the drawings for ease of description. The alignment grid itself is not displayed to users and acts as an invisible guide for the management of the layout of object blocks for the application 112. However, the line pattern background 410 may be displayed to users to provide guidance on writing size and placement, as previously described. The use of blocks and the alignment grid allow content within blocks to be edited while retaining the relative layout of the blocks.

When writing, text appears substantially where the finger or stylus is in relation to the device interface so as to preserve the free writing experience for the user. However, paragraph boundaries are aligned with the LPU and layout grid no matter what. For example, the left boundary of the paragraph is aligned with closest left column edge (gutter) and the right boundary of the paragraph is aligned with closest right column edge (gutter). Internal paragraph features, such as indentations (e.g., text horizontally offset from paragraph left origin for left-to-right written languages) may either be aligned with the columns or stored as a property, for example in the memory 108, for each line of the paragraph unrelated with LPU and layout grid sizing.

In FIG. 17 a paragraph 1706 is shown which is aligned to the left-most or first vertical line 1704 of the grid 1700 and spans four of the horizontal lines 1702 of the grid 1700, or four LPUs. The paragraph contains handwritten text depicted as solid horizontal lines. A boundary 1706*a* (shown in dashed lines) is defined about the paragraph 1706. As shown the text of the paragraph 1706 itself is not snapped to the alignment grid, so that the user does not gain the feeling that their control is lost, however the boundary 1706*a* of the paragraph 1706 is aligned with the horizontal and vertical lines 1702, 1704 of the grid 1700 nearest the paragraph content. While the text is not snapped to the alignment grid, it can be seen that the ruler 508 of the guide element 500 is provided as the top horizontal line of the boundary 1706*a* of the paragraph 1706, and as such the guide element 500 is snapped to the alignment grid 1700. This is shown more clearly in FIG. 18 in which a paragraph 1800 aligned to the left-most vertical line 1704 has handwritten text (depicted as solid horizontal lines) which just extends into the fourth column of the alignment grid 1700 such that a boundary 1800*a* (shown in dashed lines) defined about the paragraph 1800 extends to the fifth vertical line 1704 thereby defining the ruler 508 of the guide element 500 to that vertical line 1704 of the grid 1700.

The boundaries of paragraph/content blocks are those used by the present system and method to determine the extent of the input elements in relation to the alignment grid and as such are not typically displayed by the application 112 to users, except for the top boundary which is displayed as the ruler of the guide element. However, during editing operations, such as movement of blocks, etc., all of the boundaries may be displayed to assist users in proper placement of the elements relative to other elements of a layout. Further, in order to assist users' perception of appropriate spacing display of the line pattern background within the gutters of at least a current input column may be omitted during input. For example, during input in the second column of a four column grid, the line pattern background is omitted/masked in the left and right gutters of the second column, and may further be omitted/masked in the right gutter of the first column and the left column of the third column.

The digital note taking application provided by the present system and method allows users to handwrite content using the computing device which can be transformed into sharable formatted documents on the computing device as natural writing is allowed to be input, since the writing is guided to be made on (ruled) lines, and paragraphs and other layout elements are respected, and typesetting of the handwriting is made and live recognition feedback which is not distracting to the users handwriting input.

While the foregoing has described what is considered to be the best mode and/or other examples, it is understood that various modifications may be made therein and that the subject matter disclosed herein may be implemented in various forms and examples, and that they may be applied in numerous other applications, combinations, and environments, only some of which have been described herein. Those of ordinary skill in that art will recognize that the disclosed aspects may be altered or amended without departing from the true spirit and scope of the subject matter. Therefore, the subject matter is not limited to the specific details, exhibits, and illustrated examples in this description. It is intended to protect any and all modifications and variations that fall within the true scope of the advantageous concepts disclosed herein.

We claim:

1. A system for guiding handwriting input to a computing device, the computing device comprising a processor and at least one non-transitory computer readable medium for recognizing the handwriting input under control of the processor, the at least one non-transitory computer readable medium configured to:

generate, on an interactive display of the computer device, a guide element contiguous with at least a portion of a display of digital ink corresponding to the handwriting input, the guide element configured to guide further handwriting input, wherein the guide element includes a dynamic prompter which dynamically displays typeset ink corresponding to the digital ink recognized from the handwriting input as the handwriting is input; and position the guide element coextensively with respect to the handwriting input such that the guide element is correspondingly resized as the handwriting is input to the interactive display.

2. The system of claim 1, wherein the dynamic prompter includes at least one interactive prompter element, the at least one non-transitory computer readable medium configured to cause a change in at least the typeset ink in response to receiving interaction with the at least one interactive prompter element.

3. The system of claim 2, wherein the at least one interactive prompter element includes the typeset ink.

4. The system of claim 2, wherein the at least one interactive prompter element includes at least one tag related to the typeset ink.

5. The system of claim 4, wherein the at least one tag is related to one or more languages of words containing the typeset ink.

6. The system of claim 1, wherein the guide element includes a dynamic ruler which dynamically indicates at least one dimension of the digital ink as the handwriting is input.

7. The system of claim 6, wherein the typeset ink is displayed along at least one dimension of the dynamic ruler.

8. The system of claim 6, wherein the dynamic ruler indicates a width of a content block containing the digital ink.

9. The system of claim 8, wherein the dynamic ruler includes an interactive ruler element, the at least one non-transitory computer readable medium configured to cause change in at least the width of the content block in response to receiving interaction with the interactive element.

10. The system of claim 1, wherein the guide element includes an interactive control element, the at least one non-transitory computer readable medium configured to cause the processor to control the at least one non-transitory computer readable medium in response to receiving interaction with the interactive control element.

11. A method for guiding handwriting input to a computing device, the computing device comprising a processor and at least one non-transitory computer readable medium for recognizing the handwriting input under control of the processor, the method comprising configuring the at least one non-transitory computer readable medium to:

generate, on an interactive display of the computer device, a guide element contiguous with at least a portion of a display of digital ink corresponding to the handwriting input, the guide element configured to guide further handwriting input, wherein the guide element includes a dynamic prompter which dynamically displays typeset ink corresponding to the digital ink recognized from the handwriting input as the handwriting is input; and position the guide element coextensively with respect to the handwriting input such that the guide element is correspondingly resized as the handwriting is input to the interactive display.

12. A computer program product, comprising a non-transitory computer usable medium having a computer readable program code embodied therein, said computer readable program code adapted to be executed to implement a method for guiding handwriting input to a computing device, the method comprising:

generating display of, on an interactive display of the computer device, a guide element contiguous with at least a portion of a display of digital ink corresponding to the handwriting input, the guide element configured to guide further handwriting input, wherein the guide element includes a dynamic prompter which dynamically displays typeset ink corresponding to the digital ink recognized from the handwriting input as the handwriting is input; and positioning the guide element coextensively with respect to the handwriting input such that the guide element is correspondingly resized as the handwriting is input to the interactive display.

* * * * *